United States Patent Office 3,551,528
Patented Dec. 29, 1970

3,551,528
PHOSPHONIC ACID ESTERS AND THE METHOD
FOR THEIR PREPARATION
David I. Randall, Easton, Pa., assignor to GAF
Corporation, a corporation of Delaware
No Drawing. Filed Feb. 23, 1967, Ser. No. 617,819
Int. Cl. A01n 9/36; C07f 9/38
U.S. Cl. 260—928
21 Claims

ABSTRACT OF THE DISCLOSURE

The compounds are mixed esters of beta-haloethyl-phosphonic acid represented by the following structural Formulae a and b:

(a)
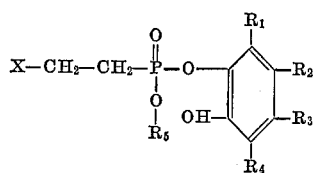

(b)
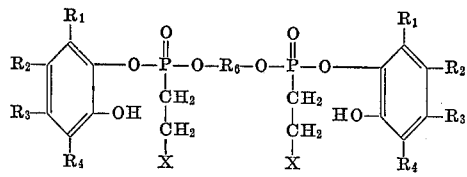

wherein X is halo, $R_1$–$R_4$ are either hydrogen, alkyl, alkoxy, or halo and two of the substituent groups may form a condensed ring, $R_5$ is aryl or an aliphatic or cycloaliphatic group and $R_6$ is alkylene.
A representative compound is ethyl 2-hydroxyphenyl betachloroethylphosphonate. The compounds possess plant growth regulating properties, e.g. control of apical dominance, and are prepared by the transesterification of the catechol and substituted catechol cyclic esters of beta-haloethylphosphonic acid.

---

This invention relates to novel phosphorous compounds and more particularly to novel phosphonic acid esters, compositions thereof, and a method for their production.

A wide variety of esters of phosphonic acid are known in the art and many of these have agricultural applications. In general, such esters have herbicidal activity but surprisingly, the phosphonic acid esters of the invention possess plant growth regulating properties and do not demonstrate an essential phytotoxic behavior.

An object of this invention is to provide novel phosphonic acid esters.

Another object of this invention is to provide a process for producing such phosphonic acid esters.

A further object of this invention is to provide phosphonic acid esters that possess plant growth regulating properties.

Still another object of this invention is to provide novel compositions of such phosphonic acid esters.

These and other objects of this invention should be readily apparent from reading the following detailed description thereof.

The objects of this invention are broadly accomplished by producing mixed esters of beta-haloethylphosphonic acid having the following structural formula:

(a)
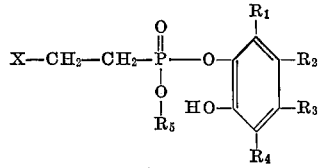

wherein X is a halo group such as fluoro, bromo, iodo, or chloro, preferably chloro or bromo, and $R_1$, $R_2$, $R_3$ and $R_4$ are substituent groups which are not strongly negative, such as halo, preferably chloro or bromo, hydrogen, alkyl, alkoxy, preferably lower alkyl and lower alkoxy, and may be the same or different groups and two of the substituent groups may form a condensed ring, either a hydrogenated or a non-hydrogenated condensed ring, and $R_5$ is either an aliphatic or a cycloaliphatic group having a non-tertiary carbon atom linked to the oxygen atom, such as alkyl, preferably lower alkyl, cycloalkyl, alkenyl, preferably lower alkenyl, alkynyl, preferably lower alkynyl, and their halo and alkoxy substituted derivatives, or an aryl group, and diesters having the following structural formula:

(b)
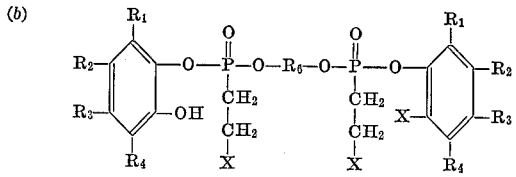

wherein X, $R_1$, $R_2$, $R_3$ and $R_4$ are as defined above and $R_6$ is alkylene, preferably lower alkylene and the carbon atoms linked to the oxygen atoms are not tertiary.

The mixed phosphonic acid esters of the invention are produced by transesterifying a catechol cyclic ester represented by the following structural formula:

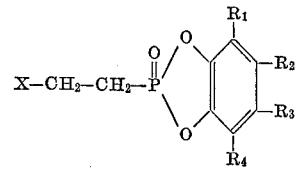

wherein X, $R_1$, $R_2$, $R_3$ and $R_4$ are as defined above, with an alcohol represented by the following structural formula:

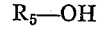

$$R_5\text{—OH}$$

wherein $R_5$ is as defined above, to produce the mixed ester represented by structural formula a or a diol represented by the following structural formula:

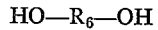

$$\text{HO—}R_6\text{—OH}$$

wherein $R_6$ is as defined above, to produce the diester represented by structural Formula b. The transesterification of the cyclic ester, unlike general transesterification reactions, proceeds rapidly at about room temperature with evolution of heat, except for aromatic alcohols ($R_5$ above is aryl), wherein slightly elevated temperatures are required. In general temperatures between about room temperature and about 100° C. are employed, except for aromatic alcohols wherein the temperature should be between about 50° C. and about 150° C. The transesterification proceeds rapidly in nearly quantitative yields and consequently, unlike general transesterification reactions, in most cases only stoichiometric quantities of alcohol are required.

The catechol cyclic esters employed as a starting material for producing the compounds of the invention may be prepared in accordance with the process disclosed by Kabachnik et al., Izvest. Akak Nauk SSSP, o.k.h.n. 1947, 97 (Chem. Abstracts 42, 4132e) both hereby incorporated by reference. Thus, as disclosed by Kabachnik et al., the starting materials for producing the compounds of the invention are produced by reacting a beta-haloethylphosphonyl chloride with catechol or a substituted catechol, e.g., beta-chloroethylphosphonyl chloride is heated with catechol at 150–160° C. to produce the catechol cyclic ester of beta-chloroethylphosphonic acid. Similarly, a substituted catechol, for example, a halo catechol, produced by adding chlorine or bromine to an acetic acid solution of cathechol, may be reacted with beta-chloroethylphosphonyl chloride to produce the corresponding cyclic ester. As a further alternative, the catechol cyclic ester of beta-chloroethylphosphonic acid may be treated to effect substitution thereof. Thus, for example, an O-dichlorobenzene solution of the catechol cyclic ester of beta-chloroethylphosphonic acid may be warmed with an excess of sulfonyl chloride to produce a tetrachloro substituted catechol cyclic ester of beta-chloroethylphosphonic acid.

The following examples are illustrative of the invention but the scope of the invention is not to be limited thereby.

EXAMPLE I 10.9 grams of the catechol cyclic ester of beta-chloroethylphosphonic acid was stirred with 2.3 grams of absolute ethanol and the temperature immediately rose to 76° C. After cooling 13.2 grams of ethyl 2-hydroxyphenyl beta-chloroethylphosphonate was recovered as a thick viscous colorless liquid which was insoluble in cold water.

EXAMPLE II 10.9 grams of the catechol cyclic ester of beta-chloroethylphosphonic acid was stirred with 3.7 grams of butanol-1 and the temperature rapidly rose to 68° C. The reaction mixture was heated on a steam bath for several minutes and 14.6 grams of butyl 2-hydroxyphenyl beta-chloroethylphosphonate was recovered as a clear viscous material. The product was insoluble in water and very soluble in both acetone and ethanol.

EXAMPLE III 10.9 grams of the cyclic catechol ester of beta-chloroethylphosphonic acid was stirred with 4.7 grams of phenol and no observable reaction took place until the mixture was heated. The mixture was heated for 6 hours at 95°–100° C. and after cooling 15.6 grams of phenyl 2-hydroxyphenyl beta-chloroethylphosphonate was recovered as a thick viscous material. No phenol could be detected. The product was insoluble in boiling water and soluble in both acetone and isopropanol.

EXAMPLE IV 10.9 grams of the cyclic catechol ester of beta-chloroethylphosphonic acid was stirred with 2.8 grams of propargyl alcohol and the temperature rose from 26° C. to 63° C. The reaction mixture was continuously stirred and the temperature fell to 25° C. 13.7 grams of 2-propynyl 2-hydroxyphenyl beta-chloroethylphosphonate were recovered. The product was insoluble in water and soluble in both acetone and ethanol.

EXAMPLE V 21.8 grams of the cyclic catechol ester of beta-chloroethylphosphonic acid was stirred with 100 cc. of isopropyl alcohol and the temperature rose from 27° C. to 38° C. The reaction mixture was heated for 2 hours at 70° C. and excess isopropanol removed under vacuum. 32.2 grams of isopropyl 2-hydroxyphenyl beta-chloroethylphosphonate were recovered as a thick oil. The product was insoluble in water and very soluble in benzene.

EXAMPLE VI 10.93 grams (.05 mole) of the catechol cyclic ester of beta-chloroethylphosphonic acid was stirred with 2.25 grams of 1,4-butanediol and the temperature rapidly rose from 26° to 61° C. The temperature then fell to 26° C. on standing overnight. 13.1 grams of a diester having the following structural formula were recovered:

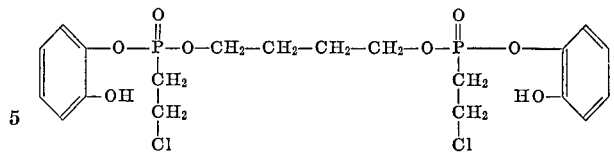

The ester was a colorless, non-pourable glossy substance insoluble in water but soluble in acetone.

EXAMPLE VII

The procedure of the previous examples is employed to transesterify the following cyclic esters:

(1) 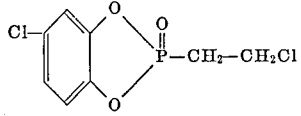

(2) 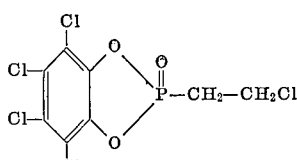

(3) 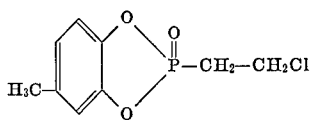

(4) 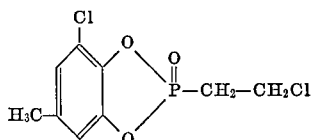

(5) 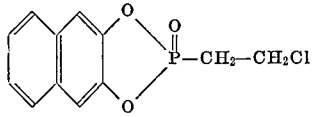

(6) 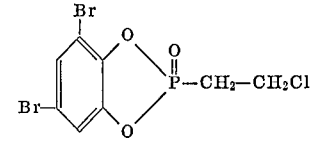

with cyclohexanol, lauryl alcohol, 2-ethyl-n-hexanol, 2-methoxyethanol and 2-chloroethanol.

The above cyclic esters of beta-bromoethylphosphonic acid are also transesterified with the hereinabove described alcohols by the procedure of the above examples.

The phosphonic esters of the invention have valuable plant growth regulating properties, including the ability to control apical dominance, i.e., the lead bud which ordinarily dominates the plant and produces one stalk is stunted and the side buds are stimulated to produce more side shoot growth. The phosphonic esters are generally sprayed onto the plants, preferably as finely divided droplets in the form of an emulsion, in amounts to provide between about 0.1 lb. and about 16 lbs. or higher, e.g., up to 25 or 30 lbs. of the compound per acre of plants. The plants which may be treated with the phosphonic esters of the invention include, small grains, such as oats (*Avena sativa*), wheat (*Triticum aestivum*) and barley (*Hordeum spp.*); cotton (*Gossypium hirsutum*); privet (*Ligustrum ovalifolium*); soybeans (Glycine max.); snapbeans (*Phaseolus vulgaris*); tomatoes (*Lycopersicon esculentum*); kidney beans (*Phaseolus vulgaris*); and the like. The above plants are merely illustrative and do not limit the invention in any manner.

Plants treated with the phosphonic esters of the invention have greater flower or fruit production, as illustrated by the following example:

EXAMPLE VIII

Young tomato plants (*Lycopersicon esculentum*) were sprayed at the two-leaf stage with an emulsion of butyl 2-hydroxyphenyl beta-chloroethylphosphonate, at a rate equivalent to 2 lbs. of the phosphonate compound per acre of soil. Observations of the treated plants, and of untreated controls, were made ten (10) weeks after spray application and are shown below:

| Treatment | Observations 10 weeks after treatment | |
|---|---|---|
| | Plant height, inches | Number of flowers plus fruit |
| Control | 30 | 2 |
| Phosphonate compound | 30 | 5 |

Visual observations of the control and treated plants showed the latter to be appreciably more highly branched and to have many root primordia developed along lower stem area.

The phosphonic esters of the invention also show antioxidant activity in organic compositions and solutions thereof may be applied to iron, e.g., iron pipes, to inhibit the formation of ferric hydroxide. In addition, organic solutions of the esters of the invention, e.g., dissolved in hot oils, may be used as anti-wear additives, antistatic agents, and dye receptors, e.g., by application to or incorporation in plastic foils or fibers.

Many modifications and variations of the present invention are possible in light of the above teachings. It is therefore to be understood that within the scope of the appended claims the invention may be practiced otherwise than as specifically described.

What is claimed is:
1. A compound selected from the group consisting of

(a)

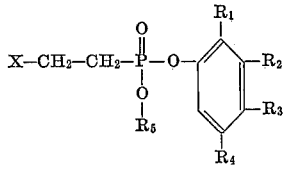

wherein X is a halo group, $R_1$, $R_2$, $R_3$, and $R_4$ are selected from the group consisting of hydrogen, lower alkyl, halo and wherein $R_2$ and $R_3$ taken together and with the ring to which they are attached form a naphthalene nucleus, and $R_5$ is selected from the group consisting of an alkyl radical of 1 to 12 carbon atoms in which the carbon atom attached to the O-atom is non-tertiary, a lower alkenyl, a lower alkynyl, cyclohexyl and phenyl, and a compound having the following structural formula:

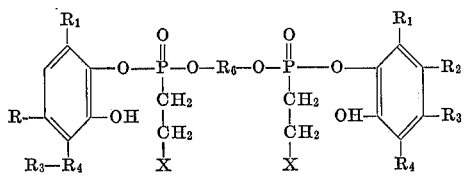

wherein X, $R_1$, $R_2$, $R_3$, and $R_4$ are as defined above and $R_6$ is lower alkylene.

2. The compound as claimed in claim 1 wherein X is selected from the group consisting of chloro and bromo.
3. The compound as claimed in claim 2 wherein the compound has the structural Formula a.
4. The compound as claimed in claim 3 wherein $R_1$, $R_2$, $R_3$ and $R_4$ are all hydrogen.
5. The compound as claimed in claim 4 wherein $R_5$ is an alkyl of 1 to 12 carbon atoms.
6. The compound as claimed in claim 4 wherein $R_5$ is phenyl.

7. The compound as claimed in claim 4 wherein $R_5$ is lower alkynyl.
8. The compound as claimed in claim 1 of the formula:

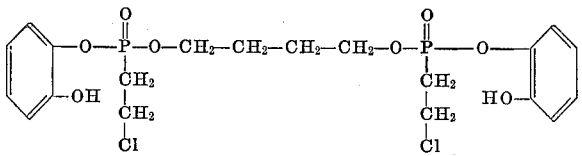

9. The compound as claimed in claim 1 of the formula:

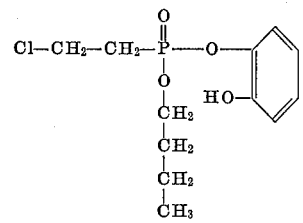

10. The compound as claimed in claim 1 of the formula:

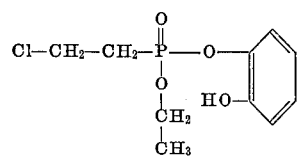

11. The compound as claimed in claim 1 of the formula:

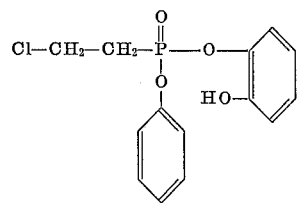

12. The compound as claimed in claim 1 of the formula:

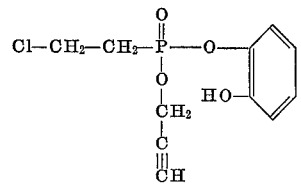

13. The compound as claimed in claim 1 of the formula.

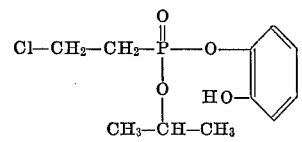

14. A method for producing a compound selected from the group consisting of a compound having the following structural formula:

(a)

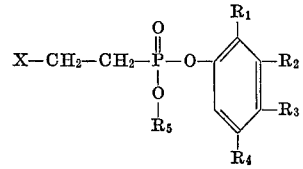

wherein X is a halo group, $R_1$, $R_2$, $R_3$, and $R_4$ are selected from the group consisting of hydrogen, lower alkyl, halo and wherein $R_2$ and $R_3$ taken together and with the ring to which they are attached form a naphthalene nucleus, and $R_5$ is selected from the group consisting of an alkyl radical of 1 to 12 carbon atoms in which the carbon atom attached to the O-atom is non-tertiary, a lower alkenyl, a lower alkynyl, cyclohexyl and phenyl, and a compound having the following structural formula:

(b) 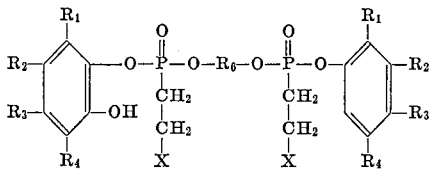

wherein X, $R_1$, $R_2$, $R_3$, and $R_4$ are as defined above and $R_6$ is lower alkylene, comprising reacting a compound (c) having the following structural formula:

(c) 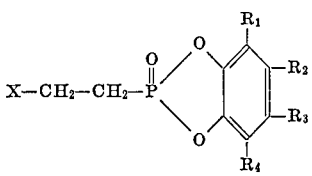

wherein X, $R_1$, $R_2$, $R_3$, and $R_4$ are as defined above with an alcohol selected from the group consisting of alcohols having the following structural formula:

$$R_5OH$$

wherein $R_5$ is as defined above, and alcohols having the following structural formula:

$$HO-R_6-OH$$

wherein $R_6$ is as defined above, at a temperature between about room temperature and 150° C.

15. The method as claimed in claim 14 wherein the compound (c) is:

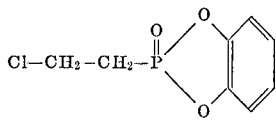

16. The method as claimed in claim 14 wherein the alcohol is ethyl alcohol.

17. The method as claimed in claim 14 wherein the alcohol is butyl alcohol.

18. The method as claimed in claim 14 wherein the alcohol is phenol and the reaction is carried out at a temperature of about 100° C.

19. The method as claimed in claim 14 wherein the alcohol is propargyl alcohol.

20. The method as claimed in claim 14 wherein the alcohol is isopropanol.

21. The method as claimed in claim 14 wherein the alcohol is 1,4-butanediol.

No references cited.

CHARLES B. PARKER, Primary Examiner

A. H. SUTTO, Assistant Examiner

U.S. Cl. X.R.

47—58; 71—86; 260—953, 982